US012665738B2

(12) United States Patent
Seo et al.

(10) Patent No.: US 12,665,738 B2
(45) Date of Patent: Jun. 23, 2026

(54) APPARATUS AND METHOD FOR CRYPTOGRAPHY SECURE AGAINST SIDE-CHANNEL ATTACKS

(71) Applicant: Samsung Electronics Co., Ltd., Suwon-si (KR)

(72) Inventors: Gisoo Seo, Suwon-si (KR); Hyosun Hwang, Suwon-si (KR); Kyoungmoon Ahn, Suwon-si (KR); Hyojoon Jin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 156 days.

(21) Appl. No.: 18/416,494

(22) Filed: Jan. 18, 2024

(65) Prior Publication Data

US 2024/0250801 A1     Jul. 25, 2024

(30) Foreign Application Priority Data

Jan. 25, 2023     (KR) ......................... 10-2023-0009260

(51) Int. Cl.
*H04L 9/00* (2022.01)
*H04L 9/08* (2006.01)

(52) U.S. Cl.
CPC ............. *H04L 9/002* (2013.01); *H04L 9/0869* (2013.01)

(58) Field of Classification Search
None
See application file for complete search history.

(56) References Cited

U.S. PATENT DOCUMENTS

| | | | | |
|---|---|---|---|---|
| 9,143,325 | B2 * | 9/2015 | Chen | G06F 7/724 |
| 10,915,466 | B2 * | 2/2021 | Hagersten | G06F 12/1483 |
| 10,965,462 | B2 * | 3/2021 | Poeppelmann | H04L 9/002 |
| 11,265,163 | B2 | 3/2022 | Poeppelmann | |
| 11,283,608 | B2 | 3/2022 | Poeppelmann | |
| 2019/0116022 | A1 * | 4/2019 | Kim | H04L 9/002 |
| 2020/0082738 | A1 | 3/2020 | Poeppelmann | |
| 2020/0110906 | A1 * | 4/2020 | Choi | G06F 21/70 |
| 2021/0359868 | A1 | 11/2021 | Poeppelmann et al. | |
| 2022/0006611 | A1 * | 1/2022 | Ghosh | H04L 9/002 |
| 2022/0006630 | A1 * | 1/2022 | Ghosh | H04L 9/0869 |

(Continued)

FOREIGN PATENT DOCUMENTS

WO     WO-2021-252294 A1     12/2021

OTHER PUBLICATIONS

European search report issued Jun. 25, 2024 in European Application No. 24153586.3.

(Continued)

*Primary Examiner* — Trang T Doan
(74) *Attorney, Agent, or Firm* — Harness, Dickey & Pierce, P.L.C.

(57)     ABSTRACT

A method of performing a plurality of operations, the plurality of operations including a plurality of first operations and at least one second operation dependent on the plurality of first operations, the method including randomly selecting a first operation from a first operation list, the first operation list including at least one first operation, among the plurality of first operations, for which operands are prepared, generating a first result by performing the randomly selected first operation, and updating the first operation list based on the randomly selected first operation.

20 Claims, 14 Drawing Sheets

(56)  References Cited

U.S. PATENT DOCUMENTS

| | | |
|---|---|---|
| 2022/0029784 A1 | 1/2022 | Satpathy |
| 2022/0029824 A1 | 1/2022 | Poeppelmann |
| 2022/0247561 A1 | 8/2022 | Ghosh et al. |
| 2025/0055687 A1* | 2/2025 | Vigilant .................. H04L 9/002 |

OTHER PUBLICATIONS

Julius Hermelink et al., "Adapting Belief Propagation to Counter Shuffling of NTTs", IACR, International Association for Cryptologic Research, vol. 20220510:081727, May 10, 2022 (May 10, 2022), pp. 1-24, XP061075106, Retrieved from the Internet: URL:https://eprint.iacr.org/archive/2022/555/1652170647.pdf <https://url.us.m.mimecastprotect.com/s/ThQVCZ6wYvCoxNkJUzA4jS?domain=eprint.iacr.org> [ retrieved on May 10, 2022] * section 3 *.
Andrea Basso et al. "Where Star Wars Meets Star Trek: SABER and Dilithium on the Same Polynomial Multiplier", IACR, International Association for Cryptologic Research, vol. 20211230:171252 Dec. 27, 2021 (Dec. 27, 2021), pp. 1-21, XP061069893, Retrieved from the Internet: URL:https://eprint.iacr.org/2021/1697.pdf <https://url.us.m.mimecastprotect.com/s/CTDNC1wYWEhEOYPVUGEFHM?domain=eprint.iacr.org> [retrieved on Dec. 27, 2021] * section 5 *.
Jeroen Delvaux, "Roulette: Breaking Kyber with Diverse Fault-Injection Setups", IACR, International Association for Cryptologic Research, vol. 20220416:113945, Apr. 16, 2022 (Apr. 16, 2022), pp. 1-29, XP061071028, Retrieved from the Internet: URL:https://eprint.iacr.org/2021/1622.pdf <https://url.us.m.mimecastprotect.com/s/k6fvC2kgx2CE6wBMUB_QB6?domain=eprint.iacr.org> [retrieved on Apr. 16, 2022] * section 3.2 *.
P. Ravi, et al., "On configurable SCA countermeasures against single trace attacks for the NTT," in a book titled Security, Privacy, and Applied Cryptography Engineering, pp. 123-146, Dec. 2020.
Erdem Ozcan et al., "High-level synthesis of No. theoretic transform: A case study for future cryptosystems," IEEE Embedded Systems Letters, vol. 12, Issue. 4, Dec. 17, 2019.

* cited by examiner

FIG. 4

: Completed Node    : Available Node    : Candidate Node    : Unavailable Node

APPARATUS AND METHOD FOR CRYPTOGRAPHY SECURE AGAINST SIDE-CHANNEL ATTACKS

CROSS-REFERENCE TO RELATED APPLICATION

This application is based on and claims priority under 35 U.S.C. § 119 to Korean Patent Application No. 10-2023-0009260, filed on Jan. 25, 2023, in the Korean Intellectual Property Office, the disclosure of which is incorporated by reference herein in its entirety.

BACKGROUND

The inventive concepts relate to cryptography, and more particularly, to an apparatus and method for cryptographic security against side-channel attacks.

A side-channel attack may be a physical attack method using physical phenomena detected in a process of performing an encryption algorithm to find secret information used in encryption, for example, a secret key instead of finding vulnerabilities in cryptography algorithms and/or performing a brute-force attack. For example, a side-channel attack may detect and use patterns in execution time, power consumption, emitted electromagnetic waves, and/or the like to by-pass cryptographic security. Accordingly, a technique for an encryption algorithm that is secure against side-channel attacks may be important.

SUMMARY

The inventive concepts provide an apparatus and method for safe encryption against side-channel attacks by randomizing the order of operations.

According to an aspect of the inventive concepts, there is provided a method of performing a plurality of operations, the plurality of operations including a plurality of first operations and at least one second operation dependent on the plurality of first operations, the method including randomly selecting a first operation from a first operation list, the first operation list including at least one first operation, among the plurality of first operations, for which operands are prepared, generating a first result by performing the randomly selected first operation, and updating the first operation list based on the randomly selected first operation.

According to an aspect of the inventive concepts, there is provided a device configured to perform a plurality of operations, the plurality of operations including a plurality of first operations and at least one second operation dependent on the plurality of first operations, the device including a non-transitory memory storing a first operation list including at least one first operation, among the plurality of first operations, for which operands are prepared, and a processing circuitry configured to access the memory, randomly select a first operation from the first operation list, generate a first result by performing the randomly selected first operation, and update the first operation list based on the randomly selected first operation.

According to an aspect of the inventive concepts, there is provided a device configured to perform a plurality of operations, the plurality of operations including a plurality of first operations and at least one second operation dependent on the plurality of first operations, the device including a non-transitory memory storing a first operation list including at least one first operation, among the plurality of first operations, for which operands are prepared, and processing circuitry configured to generate at least one first random number, access the memory, select a first operation from the first operation list based on the at least one first random number, update the first operation list based on the selected first operation, and produce a first result by performing the selected first operation.

BRIEF DESCRIPTION OF THE DRAWINGS

Embodiments will be more clearly understood from the following detailed description taken in conjunction with the accompanying drawings in which:

FIG. 4 is a diagram illustrating operations included in an encryption algorithm according to at least one embodiment;

DETAILED DESCRIPTION OF THE EMBODIMENTS

Figure 1:
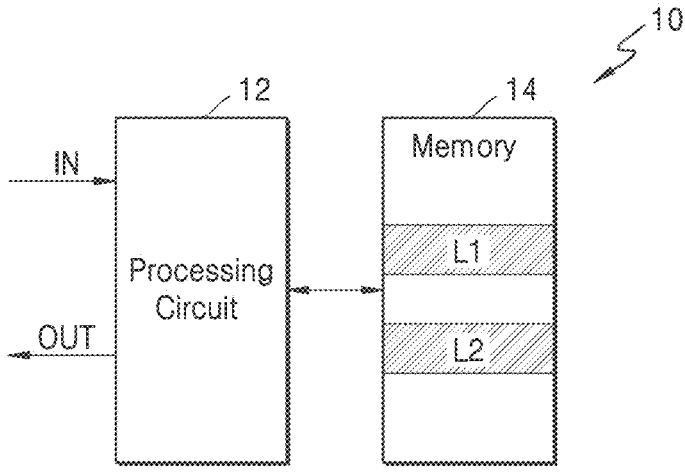
FIG. 1 is a block diagram illustrating an apparatus according to at least one embodiment.

FIG. 1 is a block diagram illustrating a device 10 according to at least one embodiment. The device 10 refers to a device configured to perform a cryptography algorithm. For example, in at least one embodiment, the device 10 may be included in an integrated circuit manufactured by a semiconductor process. As shown in FIG. 1, the device 10 includes a processing circuit 12 and a memory 14. Herein, the device 10 may also be referred to as an encryption device that is secure against side-channel attacks, a cryptographic device, and/or the like.

A cryptographic algorithm may include a plurality of operations. For example, a post-quantum cryptography (PQC) may refer to (and/or include) a cryptographic algorithm that may be protected from and/or resistant to attacks from quantum computers. In contrast, public key cryptographic algorithms, such as a Rivest-Shamir-Adleman (RSA), an elliptic curve cryptosystem (ECC), an elliptic curve digital signature algorithm (ECDSA), and/or the like are based on mathematical problems that currently take a long time to calculate with non-quantum computers (also referred to "classical" computers), such as prime factorization, but may have low resistance to quantum computers according to the, e.g., Shor algorithm. Accordingly, a quantum-resistant cryptography that is safe from attacks by quantum computers may be required as an encryption algorithm. For example, a lattice-based cryptography may be used as an example of such a quantum-resistant cryptography.

The lattice-based cryptography, such as Cryptographic Suite for Algebraic Lattices (CRYSTALS)-Dilithium, CRYSTALS-Kyber, and FALCON (Fast Fourier Lattice-based Compact signatures over NTRU (N-th degree Truncated polynomial Ring-Units)) include polynomial ring operations, and may include polynomial multiplication operations. In a polynomial multiplication, multiplication of coefficients may correspond to discrete convolution, and a conversion between a time domain and a frequency domain may be performed to reduce an execution time of the discrete convolution. A Number Theoretic Transform (NTT) may be used instead of a Discrete Fourier Transform (DFT) that may require a complex number and a floating-point operation. NTT may use integers satisfying specific conditions instead of coefficients corresponding to complex numbers used in DFT.

In at least one embodiment, NTT protects secret information based on addition and pointwise multiplication of quotient ring polynomials converted from a time domain to a frequency domain. For example, secret information generated in the time domain (for example, a secret key) may be converted into a polynomial in the frequency domain by NTT, and the secret key may be protected by multiplying or adding a specific polynomial to the converted polynomial. For example, when n is a positive integer, NTT may convert a polynomial f(x) expressed as in [Equation 1] below in the time domain to a polynomial F(X) expressed as in [Equation 2] below in the frequency domain. In [Equation 1] below, the coefficient $a_i$ may correspond to the secret key ($0 \leq i \leq n-1$), and in [Equation 2] below, w may be the k-th root of unity (k is a positive integer).

$$f(x) = \sum_{i=0}^{n-1} a_i x^i \qquad \text{[Equation 1]}$$

$$F(X) = \sum_{i=0}^{n-1} A_i X^i, \ A_i = \sum_{j=0}^{n-i} a_j w^{ij} \qquad \text{[Equation 2]}$$

The secret key may have a limited range in the time domain. For example, the secret key may correspond to a small polynomial including coefficients much less than modulus q in the time domain. In the case of CRYSTALS-Dilithium, modulus q may be 8380417, and coefficients of a polynomial corresponding to a secret key may be included in a range of −2 to 2 or −4 to 4. Accordingly, there is a possibility that all cases of operations included in the NTT will be analyzed by a side-channel attack that detects execution time, power consumption, emitted electromagnetic waves, etc. while the NTT is performed.

As described below with reference to the drawings, the device 10 may identify a dependency between operations included in an encryption algorithm, and accordingly, the order of operations may be randomized in a wide range. In addition, the predictability of the encryption algorithm may decrease due to the randomized execution order of operations, and accordingly, the encryption algorithm may be safely protected from side-channel attacks. In addition, due to the randomized execution order in a wide range of operations, even a secret key having a limited range may be effectively protected from side-channel attacks. Hereinafter, reference will be made primarily to NTT, but it is noted that the embodiments may be applied to any cryptographic algorithm (or operation) including a plurality of operations.

Referring to FIG. 1, the processing circuit 12 may receive input data IN and generate output data OUT. The processing circuit 12 may perform operations included in a cryptographic algorithm. For example, the processing circuit 12 may generate output data OUT by encrypting input data IN based on a secret key. In some embodiments, the processing circuit 12 may read input data IN from the memory 14 or a storage other than the memory 14, and may store output data OUT to the storage.

The processing circuit 12 may perform an operation based on operands and may produce a result of the operation. The processing circuit 12 may have any structure capable of performing operations. For example, the processing circuit 12 may include at least one of a programmable component, such as a central processing unit (CPU), a digital signal processor (DSP), an arithmetic logic unit (ALU), a graphics processing unit (GPU), a neural processing unit (NPU), etc., a reconfigurable component, such as a field programmable gate array (FPGA), etc., and a component providing a fixed function like an intellectual property (IP) block.

The memory 14 may be accessed by the processing circuit 12 and may store a first operation list L1 and a second operation list L2. The first operation list L1 may include at least one operation for which operands are prepared among operations included in the encryption algorithm. As described below with reference to FIG. 2, cryptographic algorithms may include operations that depend on other operations. For example, the second operation may depend on the first operation if a result of the first operation corresponds to an operand of the second operation. The first operation list L1 may include operations for which all dependent operations have been completed. Accordingly, the processing circuit 12 may immediately perform an operation included in the first operation list L1. Herein, the first operation list L1 may be referred to as a work list.

The second operation list L2 may include at least one operation, among operations included in the encryption algorithm, having operand including a result of an operation included in the first operation list L1. For example, the first operation list L1 may include an operation that may be performed immediately, and the second operation list L2 may include an operation to be added to the first operation list L1 when an operation of the first operation list L1 is performed. Herein, the second operation list L2 may be referred to as a candidate list.

The memory 14 has a structure configured to store data. In some embodiments, the memory 14 may include a tangible or non-transitory computer-readable storage media, such as a volatile memory (e.g., static random access memory (SRAM), dynamic random access memory (DRAM), etc.), and/or a nonvolatile memory (such as flash memory, resistive random access memory (RRAM), etc.). In some embodiments, the memory 14 may include a plurality of registers, such as a register set. The term "non-transitory," as used herein, is a description of the medium itself (e.g., as tangible, and not a signal) as opposed to a limitation on data storage persistency (e.g., RAM vs. ROM). In some embodiments, the memory 14 stores the operands and/or the results of operations.

In at least one embodiment, the processing circuit 12 is configured to access the memory 14 and perform operations included in the encryption algorithm based on the first operation list L1 and the second operation list L2. For example, the processing circuit 12 may randomly select at least one operation among the operations included in the first operation list L1 and perform the selected at least one operation. Accordingly, even if an encryption algorithm based on the same secret key is repeated, irregularities may occur in physical phenomena detected in a side-channel attack, and the secret key may be therefore protected from a side-channel attack.

Figure 2:
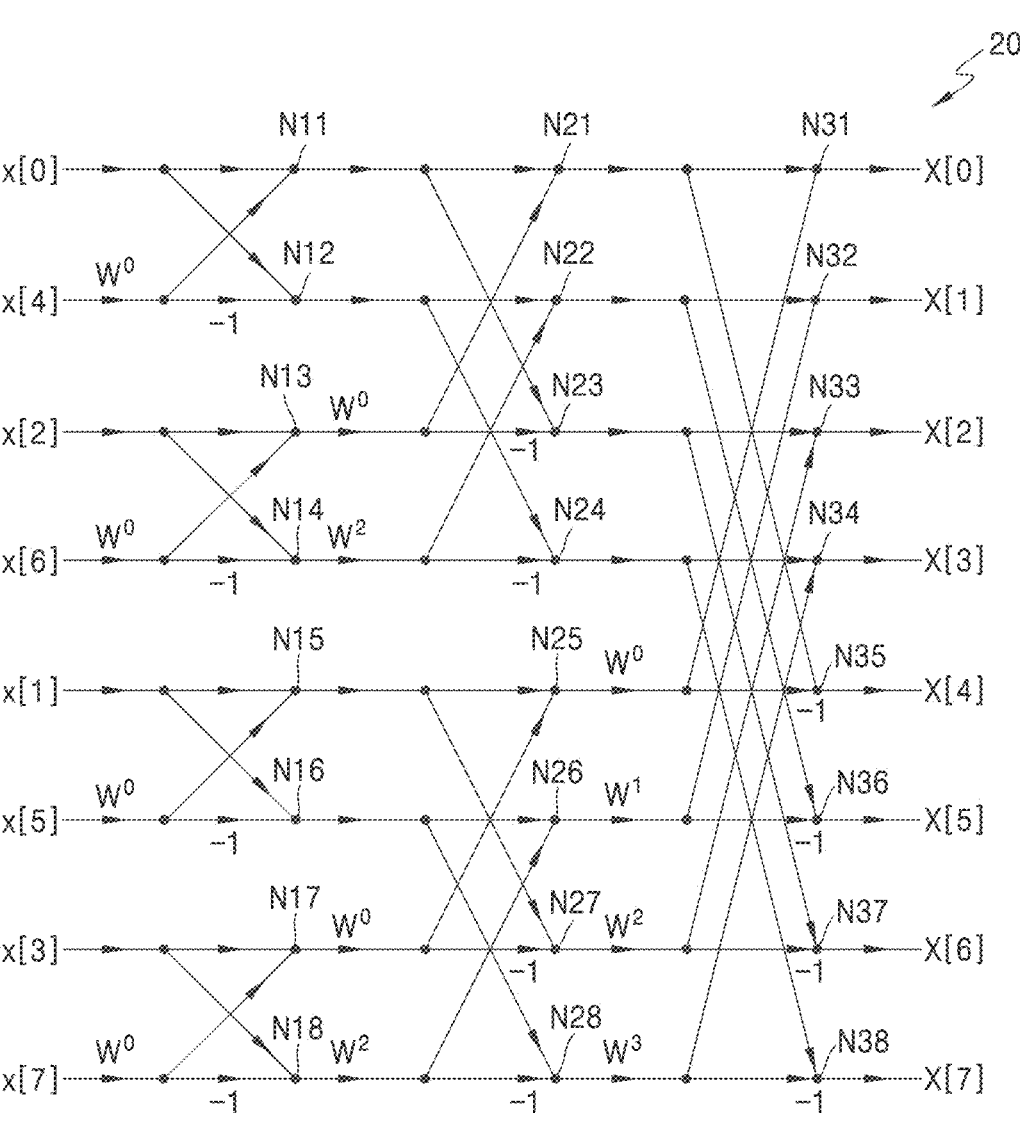
FIG. 2 is a flow graph illustrating operations included in an encryption algorithm according to at least one embodiment.

FIG. 2 is a flow graph illustrating operations included in an encryption algorithm according to at least one embodiment. More specifically, the flow graph of FIG. 2 shows an NTT computation 20 as an example of a cryptographic algorithm.

As described above with reference to FIG. 1, the NTT may transform a polynomial expressed in the time domain into a polynomial expressed in the frequency domain. For example, as shown in FIG. 2, the NTT computation 20 may convert an 8th order polynomial x[i] into an 8th order polynomial X[i] ($0 \leq i \leq 7$). The NTT computation 20 may include a plurality of operations, and one node in the flow graph of FIG. 2 may correspond to one operation. For example, node N11 may correspond to an operation such as [Equation 3] below.

$$X_{N11} = x[0] + W^0 x[4] \qquad \text{[Equation 3]}$$

In [Equation 3], $X_{N11}$ may be a result of the operation corresponding to the node N11, and x[0], $W^0$, and x[4] may be operands of the operation corresponding to the node N11. Similarly, node N12 may correspond to an operation such as [Equation 4] below.

$$X_{N12} = x[0] - W^0 x[4] \qquad \text{[Equation 4]}$$

In [Equation 4], $X_{N12}$ may be a result of the operation corresponding to the node N12, and x[0], $W^0$, and x[4] may be operands of the operation corresponding to the node N12. Two operations that share operands, such as node N11 and node N12, may be referred to as a butterfly. Herein, a node of the NTT computation 20 may be referred to as an operation node, and a performance of an operation corresponding to the node may be referred to as performing the node. Also, herein, the performed node may be referred to as a performance-completed node or a completed node.

As shown in FIG. 2, in a first stage, node N13 and node N14 may be performed based on shared operands, that is, x[2], x[6], and $W^0$. In the first stage, node N15 and node N16 may be performed based on operands, that is, x[1], x[5] and $W^0$. In the first stage, node N17 and node N18 may be performed based on the shared operands, that is, x[3], x[7] and $W^0$. In a second stage, node N21 and node N23 may be performed based on operands, that is, the result of node N11, the result of node N13, and $W^0$; node N22 and node N24 may be performed based on the operands, that is, the result of node N12, the result of node N14, and $W^2$; node N25 and node N27 may be performed based on operands, that is, the result of node N15, the result of node N17, and $W^0$; and node N26 and node N28 may be performed based on the operands, that is, the result of node N16, the result of node N18, and $W^2$. In a third stage, node N31 and node N35 may be performed based on operands, that is, the result of node N21, the result of node N25, and $W^0$; node N32 and node N36 may be performed based on the operands, that is, the result of node N22, the result of node N26, and $W^1$; node N33 and node N37 may be performed based on operands, that is, the result of node N23, the result of node N27, and $W^2$; and node N34 and node N38 may be performed based on the operands, that is, the result of node N24, the result of node N28, and $W^3$.

In at least one embodiment, the NTT computation 20 may include operations that have an interdependency. For example, operations corresponding to the nodes N11 to N18 included in the first stage may not have dependence on other operations due to prepared operands (e.g., coefficients of the polynomial x[i]). On the other hand, each of the nodes N21 to N28 included in the second stage may have operands including results of two operations corresponding to two nodes among the nodes N11 to N18 included in the first stage, and may have a dependency on the two operations of the first stage. In addition, each of the nodes N31 to N38 included in the third stage may have operands including results of two operations corresponding to two nodes among the nodes N21 to N28 included in the second stage, and may have a dependency on two operations of the second stage.

When the nodes N11 to N18 of the first stage are sequentially performed, the nodes N21 to N28 of the second stage are sequentially performed, and the nodes N31 to N38 of the third stage are sequentially performed, the NTT computation 20 may be easily exposed to a side-channel attack. As described above with reference to FIG. 1, the processing circuit 12 of FIG. 1 may randomly select and perform at least one operation among operable operations (that is, operations included in the first operation list L1) and therefore the predictability of the NTT computation 20 may be reduced. In some embodiments, the processing circuit 12 may update the first operation list L1 to include operations included in different stages. For example, before all of the nodes N11 to N18 included in the first stage are completed, at least one of the nodes N21 to N28 included in the second stage may be performed. Accordingly, the predictability of the NTT computation 20 may further be reduced. Hereinafter, polynomials of order 8 will be primarily referenced as described above with reference to FIG. 2, but it is noted that embodiments are not limited to polynomials of order 8.

Figure 3:
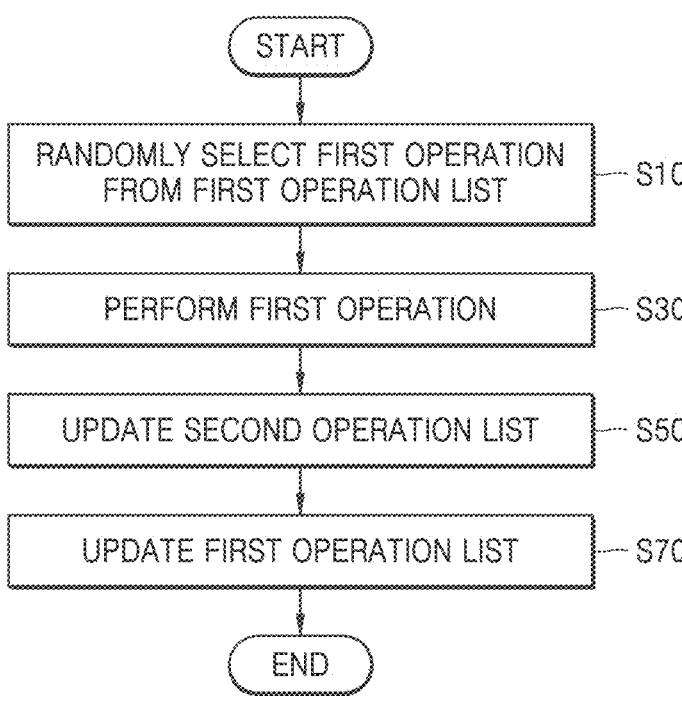
FIG. 3 is a flowchart illustrating a method of performing a plurality of operations, according to at least one embodiment.

FIG. 3 is a flowchart illustrating a method of performing a plurality of operations according to at least one embodiment. Herein, the method of FIG. 3 may also be referred to as a method for encryption that is secure against side-channel attacks. As shown in FIG. 3, the method of performing a plurality of operations may include a plurality of operations S10, S30, S50, and S70. In some embodiments, the plurality of operations S10, S30, S50, and S70 may be repeated until all operations included in the encryption algorithm are performed. In some embodiments, the method of FIG. 3 may be performed by device 10 of FIG. 1. Hereinafter, FIG. 3 is described with reference to FIG. 1.

Referring to FIG. 3, in operation S10, a first operation may be randomly selected from the first operation list L1. For example, the processing circuit 12 may read the first operation list L1 from the memory 14 and randomly select a first operation among a plurality of operations included in the first operation list L1. As described above with reference to FIG. 1, the first operation list L1 may include operations, from among operations of an encryption algorithm, for which operands are prepared, and the operations included in the first operation list L1 may be performed independently from each other. An example of operation S10 will be described later with reference to FIG. 6.

In operation S30, the selected first operation may be performed. For example, the processing circuit 12 may obtain operands of the first operation selected in operation S10 and generate a first result by performing the first operation based on the obtained operands. An example of operation S30 will be described later with reference to FIG. 10.

In operation S50, the second operation list L2 may be updated. For example, the processing circuit 12 may update the second operation list L2 based on the first operation completed in operation S30. As described above with reference to FIG. 1, the second operation list L2 may include an operation, among operations of an encryption algorithm, having an operand including a result of an operation included in the first operation list L1. An operation having a dependency on the first operation (that is, a second operation having an operand including a first result) may be identified in the second operation list L2, and the second operation list L2 may be updated based on the second operation. As described below, the identified second operation may be used to update the first operation list L1. An example of operation S50 will be described later with reference to FIG. 7.

In operation S70, the first operation list L1 may be updated. For example, the processing circuit 12 may update the first operation list L1 based on the first operation completed in operation S30. Also, the processing circuit 12 may update the first operation list L1 based on the second operation of the second operation list L2 identified in operation S50. Accordingly, the first operation list L1 may be maintained to include operations that may be immediately performed independently from each other. An example of operation S70 will be described later with reference to FIG. 8.

Figure 4:
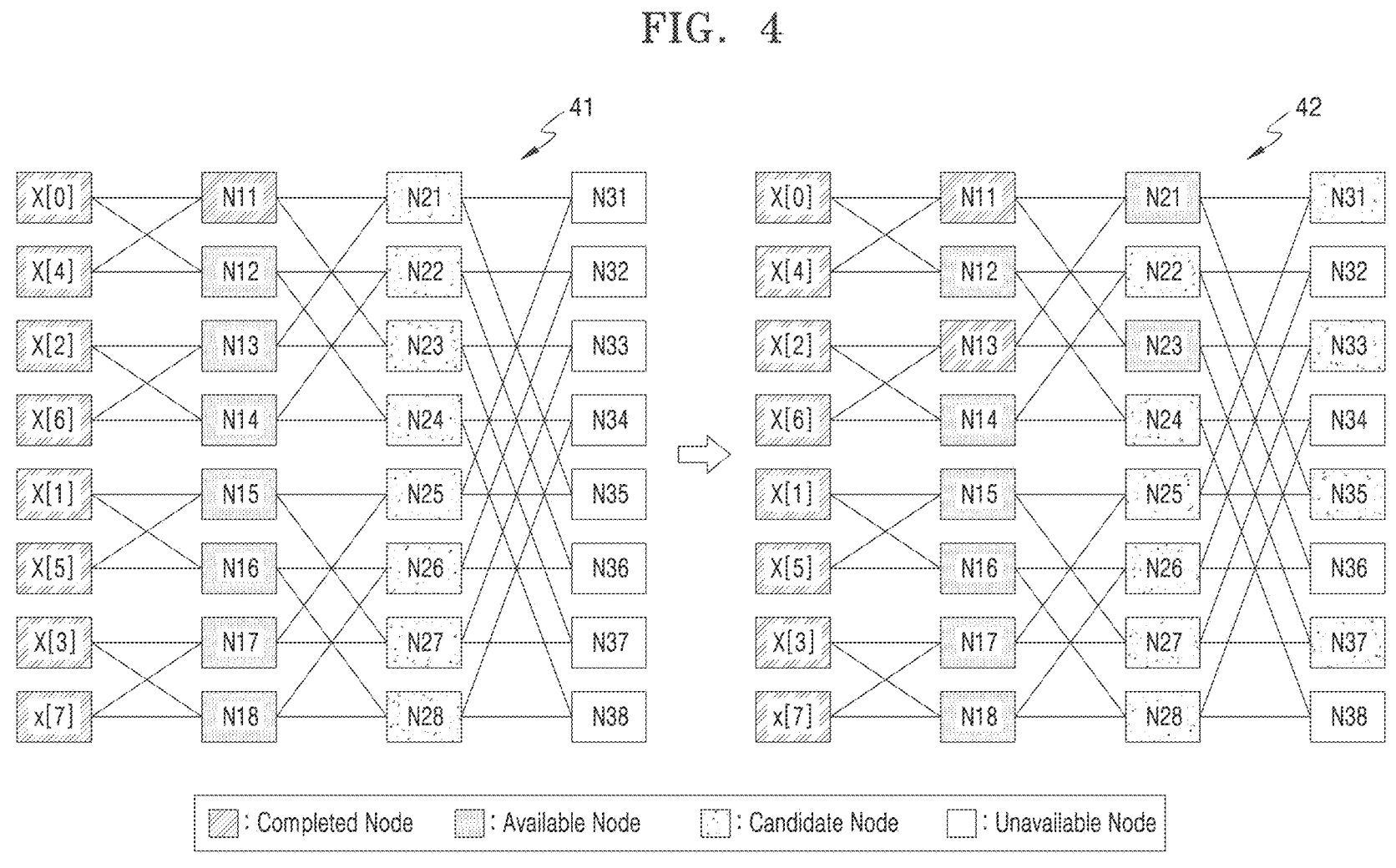

FIG. 4 is a diagram illustrating operations included in an encryption algorithm according to at least one embodiment. For example, the flow graph on the left of FIG. 4 represents an NTT calculation 41 at a first time point, and the flow graph on the right side of FIG. 4 shows an NTT calculation 42 at a second time point after the first time point. As shown in FIG. 4, the NTT calculations 41 and 42 may include completed nodes, available nodes, candidate nodes, and unavailable nodes. The first operation list L1 of FIG. 1 may include available nodes, and the second operation list L2 of FIG. 1 may include candidate nodes. Hereinafter, FIG. 4 will be described with reference to FIG. 1.

Referring to FIG. 4, the NTT calculation 41 at a first time point may include the node N11 completed in the first stage. For example, the first operation list L1 may include the nodes N11 to N18 of the first stage, and the processing circuit 12 may randomly select and perform the node N11 among the nodes N11 to N18. The nodes that depend on the node N11 completed at the first time point (that is, each of the nodes N21 and N23 of the second stage) may be retained as a candidate node because other operands are not prepared. Accordingly, at the first time point, the first operation list L1 may include the nodes N12 to N18, and the second operation list L2 may include the nodes N21 to N28. The nodes N31 to N38 of the third stage are unavailable nodes and may not be included in the first operation list L1 and the second operation list L2.

At a second time point after the first time point, the NTT calculation 42 may include the node N13 completed in the first stage. For example, as described above, the first operation list L1 at the first time point may include the nodes N12 to N18, and the processing circuit 12 may randomly select and perform the node N13 from among the nodes N12 to N18. The nodes that depend on the node N13 completed at the second time point (that is, each of the nodes N21 and N23 of the second stage) may be converted from candidate nodes to available nodes because a result of another operand (that is, the node N11) is prepared. In addition, nodes having an operand including the result of each of the nodes N21 and N23 converted to available nodes, that is, the nodes N31, N33, N35, and N37 in the third stage may be converted from unavailable nodes to candidate nodes. Accordingly, at the second time point, the first operation list L1 may include the nodes N12, N14 to N18 of the first stage, and the nodes N21 and N23 of the second stage. Also, at the second time point, the second operation list L2 may include the nodes N22, N24 to N28 of the second stage, and the nodes N31, N33, N35, and N37 of the third stage. The nodes N32, N34, N36, and N38 of the third stage are unavailable nodes and may not be included in the first operation list L1 and the second operation list L2.

As described above, at the second time point, the first operation list L1 may include nodes of the second stage as well as nodes of the first stage. Accordingly, when the processing circuit 12 randomly selects and performs a node (e.g., N23) of the second stage at the second time point, a node (e.g., N23) of the second stage may be performed before all nodes N11 to N18 of the first stage are completed. Accordingly, the predictability of the encryption algorithm may further be reduced, and the resistance to side-channel attacks may be strengthened.

Figure 5:
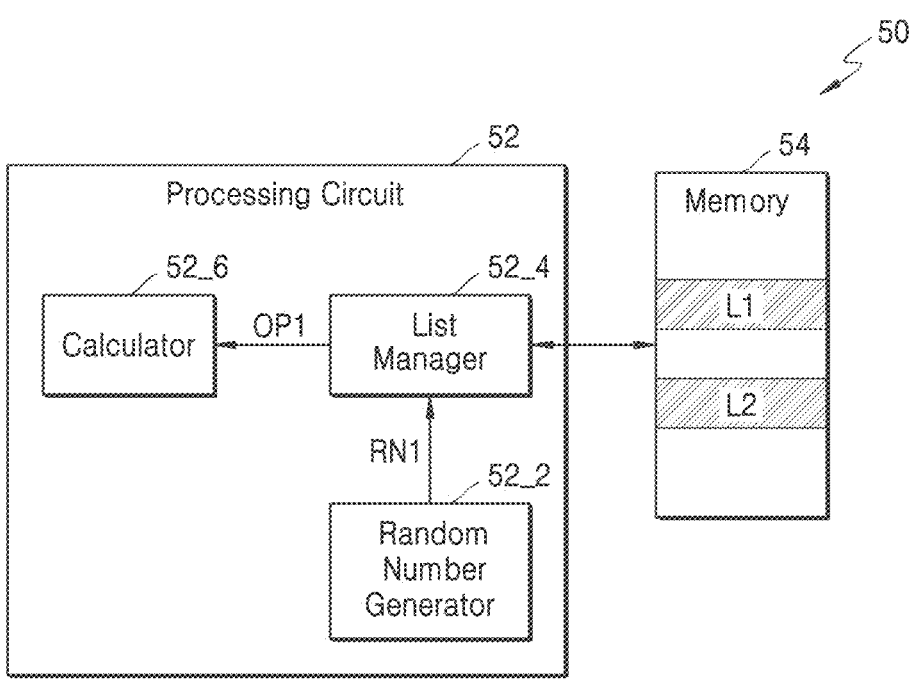
FIG. 5 is a block diagram illustrating a device according to at least one embodiment.

FIG. 5 is a block diagram illustrating a device 50 according to at least one embodiment. As shown in FIG. 5, the device 50 includes a processing circuit 52 and a memory 54, and the processing circuit 52 may include a random number generator 52_2, a list manager 52_4, and a calculator 52_6. Hereinafter, in the descriptions of FIG. 5, descriptions already given with reference to FIG. 1 are omitted.

Referring to FIG. 5, the random number generator 52_2 is configured to generate at least one first random number RN1 and may provide the at least one first random number RN1 to the list manager 52_4. In some embodiments, the random number generator 52_2 may include a true random number generator (TRNG) and a pseudo random number generator (PRNG), and the PRNG may generate at least one first random number RN1 based on a seed provided by the TRNG.

The list manager 52_4 is configured to access the memory 54 and to manage the first operation list L1 and the second operation list L2 stored in the memory 54. For example, the list manager 52_4 may select a first operation OP1 among operations included in the first operation list L1 based on at least one first random number RN1 provided from the random number generator 52_2, and the selected first operation OP1 or information on the first operation OP1 may be provided to the calculator 52_6. Accordingly, the first operation OP1 may be randomly selected from the first operation list L1. Also, the list manager 52_4 may update the first operation list L1 and the second operation list L2 based on the selected first operation OP1.

In at least one embodiment, the list manager 52_4 refers to information about operations included in the encryption algorithm in order to perform the operations described above. For example, the list manager 52_4 may refer to information defining the flow graph of FIG. 2 and may identify dependencies between operations based on information of the operations described above. Information defining the flow graph may be included in the list manager 52_4 and/or may be stored in a storage (e.g., memory 54) that is accessed by the list manager 52_4.

The calculator 52_6 may receive the first operation OP1 (or information on the first operation OP1) from the list manager 52_4 and perform the first operation OP1. For example, the calculator 52_6 may obtain operands of the first operation OP1 and perform the first operation OP1 based on the operands. In some embodiments, the calculator 52_6 may include at least one adder and/or at least one multiplier.

Figure 6:
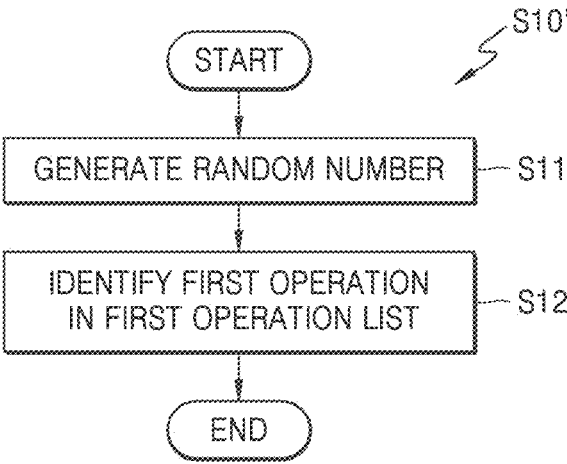
FIG. 6 is a flowchart illustrating a method of performing a plurality of operations, according to at least one embodiment.

FIG. 6 is a flowchart illustrating a method of performing a plurality of operations according to at least one embodiment. For example, the flowchart of FIG. 6 shows an example of operation S10 of FIG. 3. As described above with reference to FIG. 3, the first operation may be randomly selected from the first operation list L1 in operation S10' of FIG. 6. As shown in FIG. 6, operation S10' may include operations S11 and S12. In some embodiments, operation S10' may be performed by the device 50 of FIG. 5. Here, FIG. 6 will be described with reference to FIG. 5.

Referring to FIG. 6, a random number may be generated in operation S11. For example, the random number generator 52_2 may generate at least one first random number RN1 and provide the at least one first random number RN1 to the list manager 52_4. In some embodiments, the at least one first random number RN1 may not be exposed to the outside of the processing circuit 52.

In operation S12, a first operation may be identified in the first operation list L1. For example, the list manager 52_4 may receive at least one first random number RN1 generated in operation S11, and a first operation among operations included in the first operation list L1 may be identified based on at least one first random number RN1. Accordingly, the first operation may be randomly selected from the first operation list L1. In at least one embodiment, the list manager 52_4 may select the first operation, based on a remainder of dividing one of the at least one first random number RN1 by the number of operations included in the first operation list in a modular operation.

Figure 7:
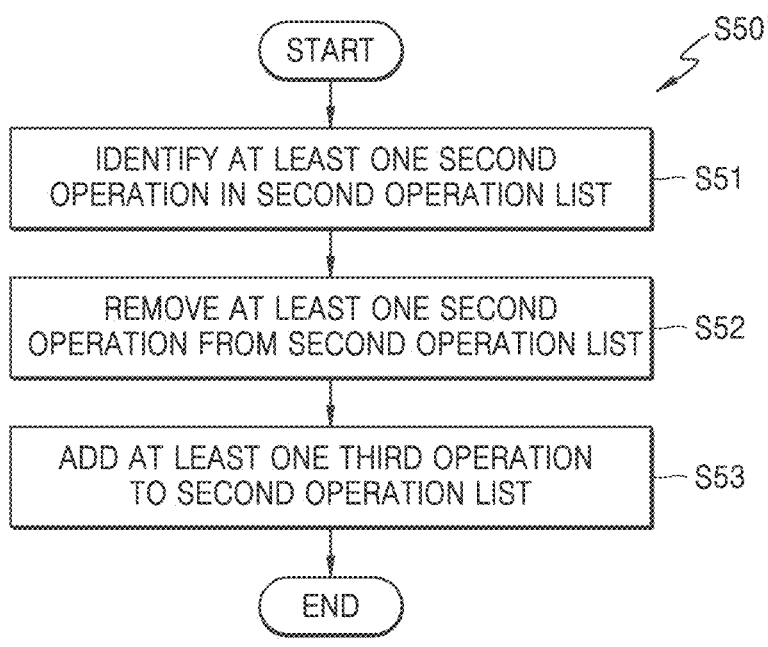
FIG. 7 is a flowchart illustrating a method of performing a plurality of operations, according to at least one embodiment.

FIG. 7 is a flowchart illustrating a method of performing a plurality of operations according to at least one embodiment. For example, the flowchart of FIG. 7 shows an example of operation S50 of FIG. 3. As described above with reference to FIG. 3, the second operation list L2 may be updated in operation S50' of FIG. 7. As shown in FIG. 7, operation S50' may include a plurality of operations S51 to S53. In some embodiments, operation S50' may be performed by the device 50 of FIG. 5. Hereinafter, FIG. 7 is described with reference to FIGS. 4 and 5.

Referring to FIG. 7, at least one second operation may be identified in the second operation list L2 in operation S51. For example, the list manager 52_4 may randomly select a first operation from the first operation list L1 as described above with reference to FIG. 6. The list manager 52_4 may identify at least one second operation for which operands including a result of the first operation are prepared among operations included in the second operation list L2. For example, as described above with reference to FIG. 4, the list manager 52_4 may identify, as the second operations, the nodes N21 and N23 which have an operand including the result of the node N13 that is randomly selected at the second time point and in which all operands are prepared.

In operation S52, at least one second operation may be removed from the second operation list L2. For example, the list manager 52_4 may remove at least one second operation identified in operation S51 from the second operation list L2. In the example of FIG. 4, the list manager 52_4 may remove the nodes N21 and N23 that are identified as the second operations at the second time point from the second operation list L2. The at least one second operation removed from the second operation list L2 may be added to the first operation list L1 as described later with reference to FIG. 8.

In operation S53, at least one third operation may be added to the second operation list L2. For example, the list manager 52_4 may identify at least one third operation to be added to the second operation list L2 based on the at least one second operation identified in operation S51. For example, the list manager 52_4 may identify at least one third operation having an operand including a result of the at least one second operation identified in operation S51, and the identified at least one third operation may be added into the second operation list L2. In the example of FIG. 4, the list manager 52_4 may identify the nodes N31, N33, N35, and N37, which have operands including the results of the nodes N21 and N23 identified as the second operations at the second time point, as third operations, and may add the nodes N31, N33, N35, and N37 to the second operation list L2.

Figure 8:
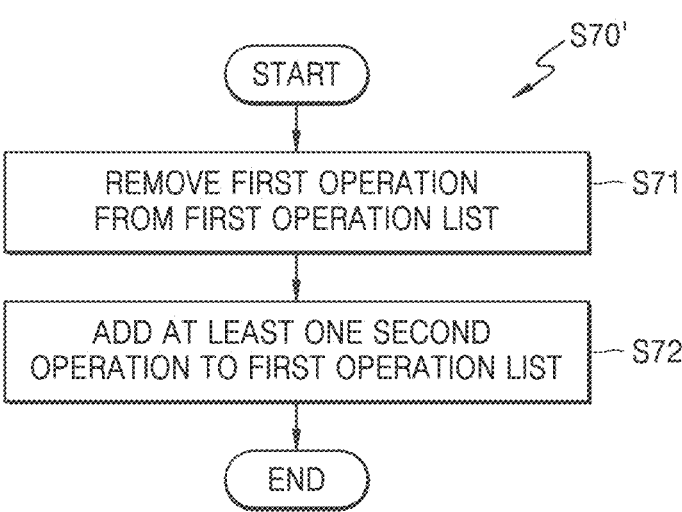
FIG. 8 is a flowchart illustrating a method of performing a plurality of operations, according to at least one embodiment.

FIG. 8 is a flowchart illustrating a method of performing a plurality of operations according to at least one embodiment. For example, the flowchart of FIG. 8 shows an example of operation S70 of FIG. 3. As described above with reference to FIG. 3, the first operation list L1 may be updated in operation S70' of FIG. 8. As shown in FIG. 8, operation S70' may include operations S71 and S72. In some embodiments, operation S70' may be performed by the device 50 of FIG. 5. Hereinafter, FIG. 8 will be described with reference to FIGS. 4 and 5.

Referring to FIG. 8, the first operation may be removed from the first operation list L1 in operation S71. For example, as described above with reference to FIG. 3, the first operation may be randomly selected from the first operation list L1, and the first operation may be performed by the calculator 52_6. The list manager 52_4 may remove the first operation performed by the calculator 52_6 from the first operation list L1. In the example of FIG. 4, after the node N13 is randomly selected at the second time point, the node N13 may be removed from the first operation list L1.

At operation S72, at least one second operation may be added to the first operation list L1. For example, as described above with reference to FIG. 7, at least one second operation among the operations included in the second operation list L2 may be identified based on the randomly selected first operation, and may be removed from the second operation list L2. The list manager 52_4 may add at least one second operation removed from the second operation list L2 to the first operation list L1, and accordingly, the at least one second operation may be randomly selected later by the list manager 52_4. In the example of FIG. 4, nodes N21 and N23 identified as second operations at a second time point may be added to the first operation list L1.

Figure 9:
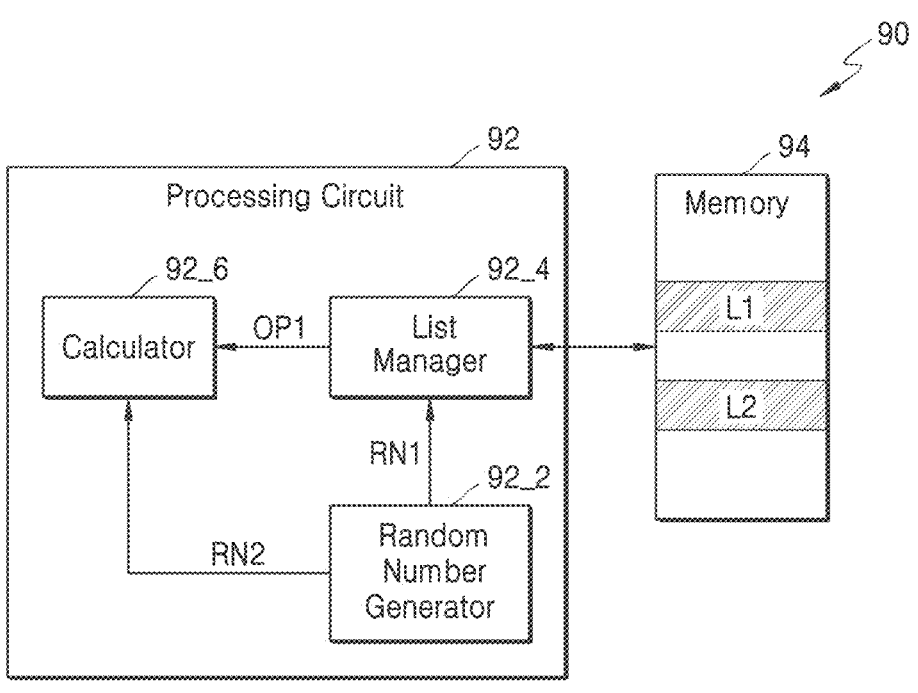
FIG. 9 is a block diagram illustrating a device according to at least one embodiment.

FIG. 9 is a block diagram illustrating a device 90 according to at least one embodiment. As shown in FIG. 9, the device 90 may include a processing circuit 92 and a memory 94, and the processing circuit 92 may include a random number generator 92_2, a list manager 92_4, and a calculator 92_6. In the following description with reference to FIG. 9, descriptions previously given with reference to FIG. 3 are omitted.

Referring to FIG. 9, the random number generator 92_2 is configured to generate at least one first random number RN1. The at least one first random number RN1 may be provided to the list manager 92_4, and the list manager 92_4 may randomly select a first operation OP1 from the first operation list L1 based on the at least one first random number RN1, and may provide the first operation OP1 to the calculator 92_6.

The random number generator 92_2 is further configured to generate at least one second random number RN2 and to provide the at least one second random number RN2 to the calculator 92_6. The calculator 92_6 is configured to perform the first operation OP1 randomly selected by the list manager 92_4 based on the at least one second random number RN2. For example, the calculator 92_6 may perform an operation that generates the same result as that of the first operation OP1 independently from the second random number RN2 and has operands including operands of the first operation OP1 and the at least one second random number RN2. Accordingly, even if the first operation OP1 having the same operands is repeated, a physical phenomenon caused by the calculator 92_6 may be randomly varied by the at least one second random number RN2. As a result, the predictability of the encryption algorithm may further be reduced, and the encryption algorithm may be safely protected from side-channel attacks. Herein, the use of a random number independent of a result for an operation may be referred to as masking.

Figure 10:
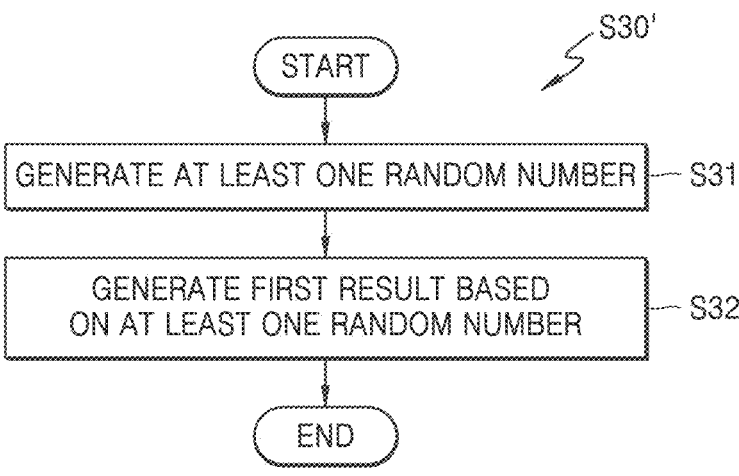
FIG. 10 is a flowchart illustrating a method of performing a plurality of operations, according to at least one embodiment.

FIG. 10 is a flowchart illustrating a method of performing a plurality of operations according to at least one embodiment. For example, the flowchart of FIG. 10 shows an example of operation S30 of FIG. 3. As described above with reference to FIG. 3, a randomly selected first operation may be performed in operation S30' of FIG. 10. As shown in FIG. 10, operation S30' may include operations S31 and S32. In some embodiments, operation S30' may be performed by the device 90 of FIG. 9. Hereinafter, FIG. 10 will be described with reference to FIGS. 4 and 9.

Referring to FIG. 10, at least one random number may be generated in operation S31. For example, the random number generator 92_2 may generate at least one second random number RN2 and provide the at least one second random number RN2 to the calculator 92_6. In some embodiments, the at least one second random number RN2 may not be exposed to the outside of the processing circuit 92.

In operation S32, a first result may be generated based on at least one random number. For example, the calculator 92_6 may generate a first result which is a result of the first operation OP1 based on the at least one second random number RN2 provided from the random number generator 92_2. For example, when the node N11 of FIG. 4 is selected as the first operation OP1 and second random numbers $r_1$ and $r_2$ are generated by the random number generator 92_2, the calculator 92_6 may perform an operation of the following [Equation 5].

$$X_{N11} = \left( x[0] - r_1 + W^0(x[4] - r_2) \right) + \left( r_1 + r_2 W^0 \right) \qquad \text{[Equation 5]}$$

The result $X_{N11}$ of the node N11 in [Equation 5] may be the same as the result $X_{N11}$ in [Equation 3] and therefore the result $X_{N11}$ of the node N11 in [Equation 5] may be considered independent from the second random numbers $r_1$ and $r_2$.

Figure 11:
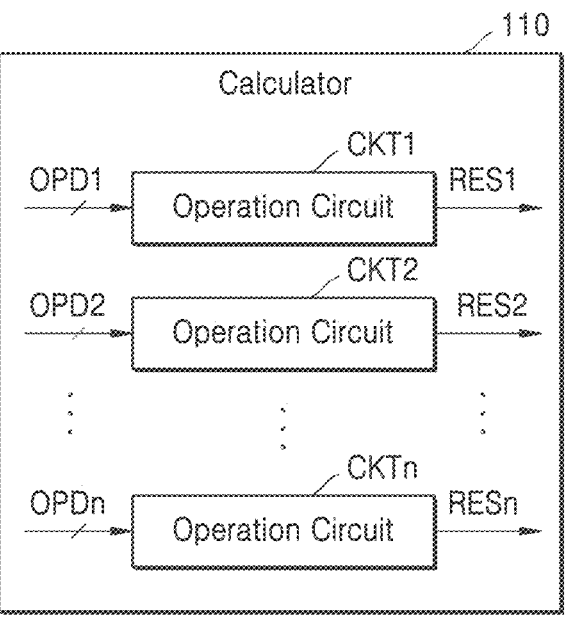
FIG. 11 is a block diagram illustrating a calculator according to at least one embodiment.

FIG. 11 is a block diagram illustrating a calculator 110 according to at least one embodiment. As described above with reference to the drawings, the calculator 110 of FIG. 11 may perform an operation randomly selected by the list manager (e.g., 52_4 of FIG. 5).

In some embodiments, the calculator 110 may include a plurality of operation circuits that each perform a plurality of operations independently from each other. For example, as shown in FIG. 11, the calculator 110 may include first to $n^{th}$ operation circuits CKT1 to CKTn (n is an integer greater than 1). The first to $n^{th}$ operation circuits CKT1 to CKTn may independently perform operations. For example, the first operation circuit CKT1 may generate a first result RES1 by performing an operation based on a plurality of first operands OPD1, the second operation circuit CKT2 may generate a second result RES2 by performing an operation based on a plurality of second operands OPD2, and the $n^{th}$ operation circuit CKTn may generate an $n^{th}$ result RESn by performing an operation based on a plurality of $n^{th}$ operands OPDn. In some embodiments, as described above with reference to FIGS. 9 and 10, the first to $n^{th}$ operation circuits CKT1 to CKTn may receive at least one random number, respectively, and may generate the first to $n^{th}$ results RES1 to RESn independent from at least one random number, respectively.

In some embodiments, the calculator 110 may perform two or more operations in parallel. For example, the list manager (e.g., 52_4 in FIG. 5) may randomly select two or more operations from the first operation list L1 and provide the selected two or more operations to the calculator 110. The calculator 110 may assign the two or more operations to two or more of the first to $n^{th}$ operation circuits CKT1 to CKTn, respectively. The operation circuits may generate two or more results by performing the assigned operations in parallel with each other. When two or more operations are randomly selected and performed, the predictability of the encryption algorithm may further be reduced due to possible combinations of the two or more operations.

Figure 12:
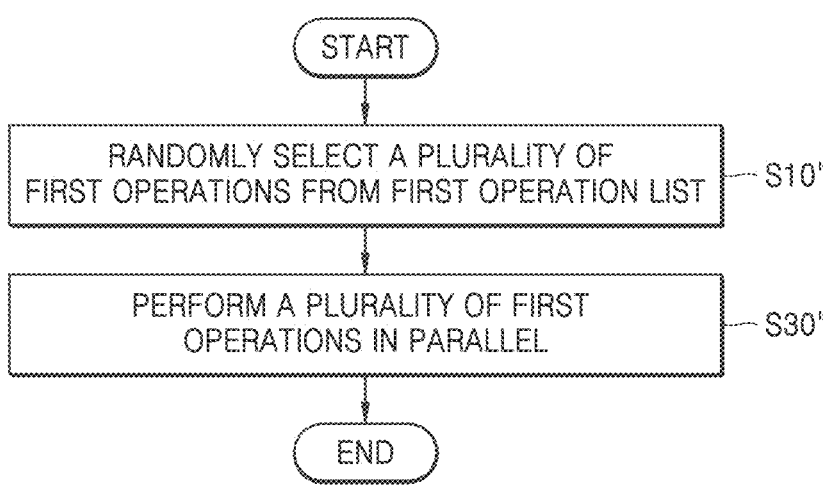
FIG. 12 is a flowchart illustrating a method of performing a plurality of operations, according to at least one embodiment.

FIG. 12 is a flowchart illustrating a method of performing a plurality of operations according to at least one embodiment. Herein, the method of FIG. 12 may also be referred to as a method of encryption that is secure against side-channel attacks. As shown in FIG. 12, the method of performing a plurality of operations may include operations S10" and S30". In some embodiments, operations S50 and S70 of FIG. 3 may be subsequently performed following operation S30". In some embodiments, the method of FIG. 12 may be performed by a device that includes calculator 110 of FIG. 11. Hereinafter, FIG. 12 is described with reference to FIGS. 1 and 11, and it is assumed that the processing circuit 12 of FIG. 1 includes the calculator 110 of FIG. 11.

Referring to FIG. 12, in operation S10", a plurality of first operations may be randomly selected from the first operation list L1. For example, the processing circuit 12 (or a list manager included in the processing circuit) may read the first operation list L1 from the memory 14, and may randomly select a plurality of first operations among operations included in the first operation list L1. In some embodiments, the processing circuit 12 may generate a plurality of random numbers and select a plurality of first operations based on the plurality of random numbers.

In operation S30", a plurality of first operations may be performed in parallel. For example, the processing circuit 12 may obtain operands of the plurality of first operations selected in operation S10". A plurality of operation circuits included in the calculator 110 may perform a plurality of first operations in parallel, respectively, based on the obtained operands. Because a plurality of randomly selected operations are performed in parallel, the predictability of the encryption algorithm may further be reduced due to combinations of the plurality of operations.

In some embodiments, the processing circuit 12 (or a list manager included in the processing circuit) may randomly set the number of first operations selected in operation S10". For example, the processing circuit 12 may randomly determine the number of the first operations to select, and may randomly select the determined number of first operations. The calculator 110 may perform the randomly selected number of first operations, and may perform two or more operations in parallel when two or more first operations are selected.

Figure 13:
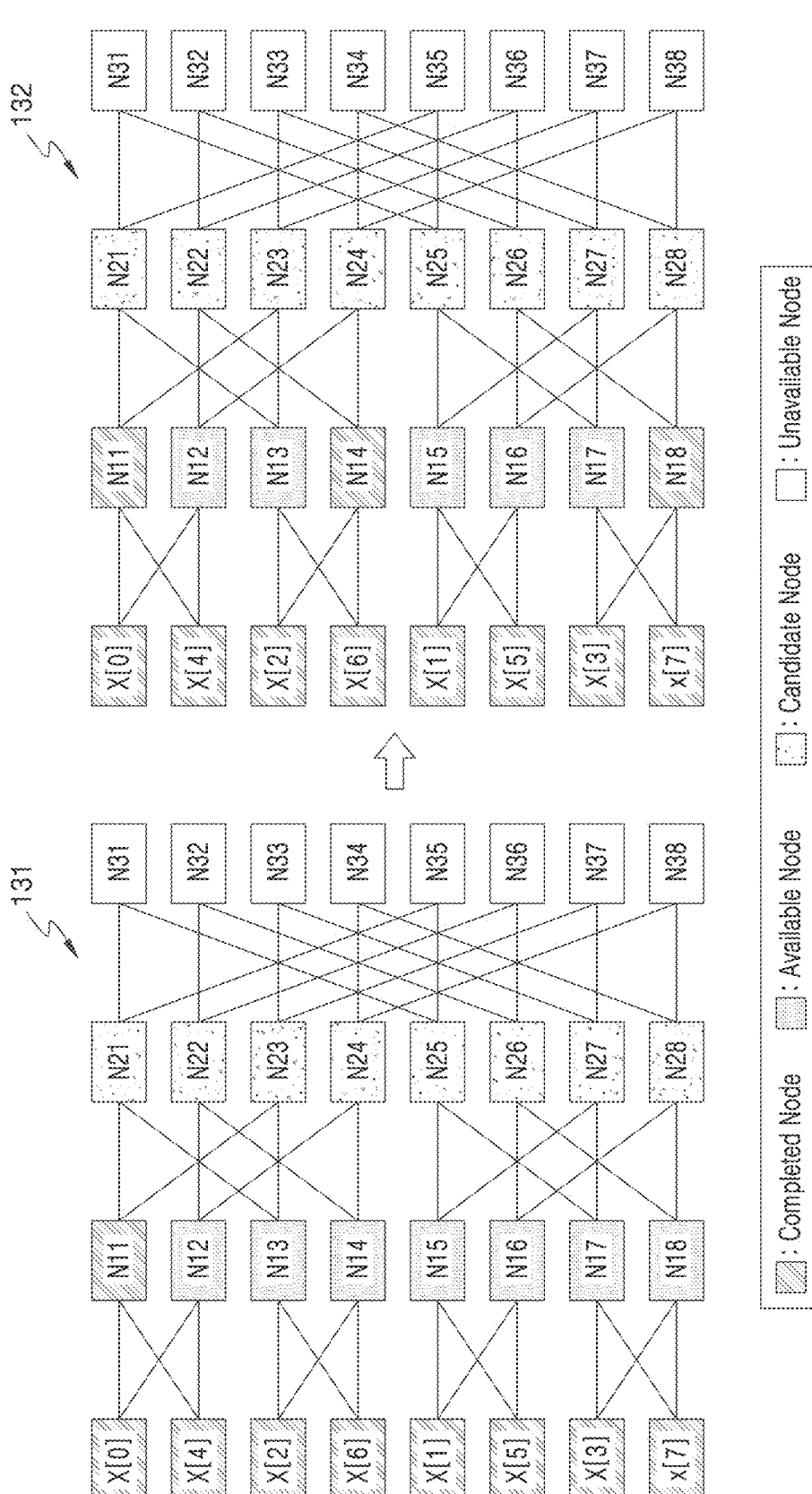
FIG. 13 is a diagram illustrating operations included in an encryption algorithm according to at least one embodiment.

FIG. 13 is a diagram illustrating operations included in an encryption algorithm according to at least one embodiment. For example, a flow graph on the left of FIG. 13 represents an NTT calculation 131 at a first time point, and a flow graph on the right of FIG. 13 shows an NTT calculation 132 at a second time point after the first time point. As shown in FIG. 13, the NTT calculations 131 and 132 at different time points may include completed nodes, available nodes, candidate nodes, and unavailable nodes. A first operation list L1 may include available nodes, and a second operation list L2 may include candidate nodes. Hereinafter, FIG. 13 is described with reference to FIGS. 1 and 11, and it is assumed that the processing circuit 12 of FIG. 1 includes the calculator 110 of FIG. 11.

Referring to FIG. 13, the NTT calculation 131 at a first time point may include a node N11 completed in the first stage. For example, the first operation list L1 may include the nodes N11 to N18 of the first stage, and the processing circuit 12 may randomly select the node N11 among the nodes N11 to N18. Nodes dependent on the node N11 completed at the first time point, that is, nodes N21 and N23 of the second stage, may be maintained as candidate nodes because other operands are not prepared. Accordingly, at the first time point, the first operation list L1 may include nodes N12 to N18, and the second operation list L2 may include nodes N21 to N28. Nodes N31 to N38 of the third stage are unavailable nodes and may not be included in the first operation list L1 and the second operation list L2.

At a second time point after the first time point, the NTT calculation 132 may include nodes N14 and N18 completed in the first stage. For example, as described above with reference to FIGS. 11 and 12, the processing circuit 12 may randomly select two or more operations from the first operation list L1, and the calculator 110 may perform two or more operations in parallel. Nodes that depend on the nodes N14 and N18 completed at the second time point, that is, the nodes N22, N24, N26, and N28 of the second stage, respectively, may be maintained as candidate nodes because other operands are not prepared. Accordingly, at the second time point, the first operation list L1 may include the nodes N12, N13, N15 to N17 of the first stage. Also, at the second time point, the second operation list L2 may include the nodes N21 to N28 of the second stage. Nodes N31 to N38 of the third stage are unavailable nodes and may not be included in the first operation list L1 and the second operation list L2.

Figure 14:
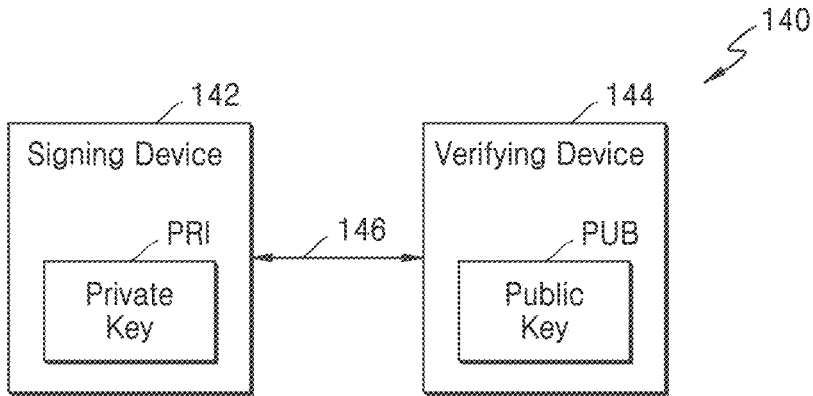
FIG. 14 is a block diagram illustrating a security system according to at least one embodiment.

FIG. 14 is a block diagram illustrating a security system 140 according to at least one embodiment. An apparatus and/or method of performing a plurality of operations described above with reference to the drawings may be employed in the security system 140. It is noted that the embodiments are not limited to the security system 140 of FIG. 14. As shown in FIG. 14, the security system 140 may include a signing device 142 and a verifying device 144.

The signing device 142 and the verifying device 144 may be any devices that communicate with each other via a communication link 146. For example, each of the signing device 142 and the verifying device 144 may be and/or be included in a stationary computing system (such as a desktop computer, a server, etc.), a portable computing system (such as a laptop computer, a tablet computer, a smart phone, etc.), a wearable device (such as a smart watch or smart glasses), in a vehicle (such as an electric car), and/or the like.

The signing device 142 is configured to perform a cryptographic function based on a private key (or secret key) PRI. In some embodiments, the signing device 142 may generate a signature to be transmitted through the communication link 146 and may verify a signature. When a signature is generated by the signing device 142, a message and signature may be provided to verifying device 144 via communication link 146. In some embodiments, the message may or may not be encrypted. In some embodiments, the signing device 142 may perform encryption, decryption, signing, and/or signature verification based on the private key PRI. In some embodiments, the signing device 142 may set up a secure connection with the verifying device 144 through the communication link 146 based on the private key PRI.

The verifying device 144 is configured to perform a cryptographic function based on a public key PUB. In some embodiments, the verifying device 144 may verify a signature based on a signature and/or message provided through the communication link 146 from the signing device 142. The verifying device 144 may determine that the message to be reliable if the verification succeeds, but may determine the message to be unreliable if the verification fails.

The signing device 142 and/or the verifying device 144 may include a device for performing a plurality of operations described above with reference to the drawings, or may perform the method of performing a plurality of operations described above with reference to the drawings to perform the respective cryptographic functions. Accordingly, the predictability of the encryption algorithm may be reduced, and the security system 140 may be safe from side-channel attacks.

While the inventive concepts have been particularly shown and described with reference to embodiments thereof, it will be understood that various changes in form and details may be made therein without departing from the spirit and scope of the following claims.

What is claimed is:

1. A method of encrypting an input, the encrypting including performing a plurality of operations, the plurality of operations including a plurality of first operations and at least one second operation dependent on the plurality of first operations, the method comprising:

randomly selecting a first operation from a first operation list, the first operation list including first operations, among the plurality of first operations, for which operands are prepared;

generating a first result by performing the randomly selected first operation based on the input;

updating the first operation list based on the randomly selected first operation; and updating a second operation list based on the randomly selected first operation, the second operation list including the at least one second operation, wherein the plurality of first operations and the at least one second operation are operations for the encrypting the input and generating an encrypted output.

2. The method of claim 1, wherein the randomly selecting the first operation comprises:

generating a random number; and identifying the randomly selected first operation from the first operation list based on the random number.

3. The method of claim 1, wherein the generating the first result comprises:

generating at least one random number; and generating and masking the first result by performing an operation having operands including the operands of the randomly selected first operation and the at least one random number such that the first result is independent from the at least one random number.

4. The method of claim 1, wherein the at least one second operation has an operand including a result of the randomly selected first operation.

5. The method of claim 1, wherein the updating the second operation list comprises:

identifying a second operation, among the at least one second operation, for which operands, including the result of the randomly selected first operation, are prepared;

removing the identified second operation from the second operation list; and adding at least one third operation to the second operation list, the at least one third operation having an operand including a result of the identified second operation.

6. The method of claim 5, wherein the updating the first operation list comprises:

removing the randomly selected first operation from the first operation list; and adding the identified second operation to the first operation list.

7. The method of claim 1, wherein the plurality of operations are included in a number theoretic transform (NTT).

8. The method of claim 7, wherein the first operation list includes at least two first operations included in different stages of the NTT.

9. The method of claim 1, further comprising:

randomly selecting an additional first operation from the first operation list, the additional first operation being different from the first operation; and generating a second result by performing the selected additional first operation, wherein the generating the first result and the generating the second result are performed in parallel.

10. A device configured to perform a plurality of operations, the plurality of operations including a plurality of first operations and at least one second operation dependent on the plurality of first operations, the device comprising:

a non-transitory memory storing a first operation list including first operations, among the plurality of first operations, for which operands are prepared; and processing circuitry configured to encrypt an input by accessing the non-transitory memory, randomly selecting a first operation, from the first operation list, generate a first result by performing the randomly selected first operation based on the input, updating the first operation list based on the randomly selected first operation, and updating a second operation list based on the randomly selected first operation, the second operation list including the at least one second operation, wherein the plurality of first operations and the at least one second operation are operations for the encrypting the input and generating an encrypted output.

11. The device of claim 10, wherein the processing circuitry is further configured to generate a random number, and identify the randomly selected first operation from the first operation list based on the random number.

12. The device of claim 10, wherein the processing circuitry is further configured to generate at least one random number, and generate the first result by performing an operation having operands including the operands of the randomly selected first operation and the at least one random number such that the first result is independent from the at least one random number.

13. A device configured to perform a plurality of operations, the plurality of operations including a plurality of first operations and at least one second operation dependent on the plurality of first operations, the device comprising:

a non-transitory memory storing a first operation list including first operations, among the plurality of first operations, for which operands are prepared; and processing circuitry configured to encrypt an input by generating at least one first random number, accessing the non-transitory memory, selecting a first operation, from the first operation list, based on the at least one first random number, updating the first operation list, based on the selected first operation, producing a first result by performing the selected first operation, and updating a second operation list based on the selected first operation, the second operation list including the at least one second operation, wherein the plurality of first operations and the at least one second operation are operations for the encrypting the input and generating an encrypted output.

14. The device of claim 13, wherein the processing circuitry is further configured to generate at least one second random number, generate the first result by performing an operation having operands including the operands of the selected first operation and the at least one second random number such that the first result is independent from the at least one second random number.

15. The device of claim 13, wherein the second operation list is stored in the non-transitory memory, and the processing circuitry is configured to update the second operation list based on the selected first operation.

16. The device of claim 15, wherein the processing circuitry is further configured to identify a second operation, among the at least one second operation, for which operands, including the result of the selected first operation, are prepared, remove the identified second operation from the second operation list, and add at least one third operation, to the second operation list, the at least one third operation having an operand including a result of the identified second operation.

17. The device of claim 16, wherein the processing circuitry is configured to update the first operation list by removing the selected first operation from the first operation list and adding the identified second operation to the first operation list.

18. The device of claim 13, wherein the plurality of operations are included in a number theoretic transform (NTT).

19. The device of claim 18, wherein the first operation list includes at least two first operations included in different stages of the NTT.

20. The device of claim 13, wherein the processing circuitry is configured to select an additional first operation, different from the first operation, from the first operation list, based on the at least one first random number, and generate a second result by performing the selected additional first operation such that the first result and the second result are generated in parallel.

\* \* \* \* \*